US010620472B2

(12) United States Patent
Lin et al.

(10) Patent No.: US 10,620,472 B2
(45) Date of Patent: Apr. 14, 2020

(54) DISPLAY SUBSTRATE, MANUFACTURING METHOD THEREOF AND DISPLAY DEVICE

(71) Applicants: BOE Technology Group Co., Ltd., Beijing (CN); Beijing BOE Optoelectronics Technology Co., Ltd., Beijing (CN)

(72) Inventors: Haiyun Lin, Beijing (CN); Qinghui Zhao, Beijing (CN); Yongshan Zhou, Beijing (CN); Jingpeng Li, Beijing (CN); Zhenyu Xie, Beijing (CN); Tae Yup Min, Beijing (CN)

(73) Assignees: BOE Technology Group Co., Ltd., Beijing (CN); Beijing BOE Optoelectronics Technology Co., Ltd., Beijing (CN)

(*) Notice: Subject to any disclaimer, the term of this patent is extended or adjusted under 35 U.S.C. 154(b) by 207 days.

(21) Appl. No.: 15/556,833

(22) PCT Filed: Jan. 13, 2017

(86) PCT No.: PCT/CN2017/071041
§ 371 (c)(1),
(2) Date: Sep. 8, 2017

(87) PCT Pub. No.: WO2018/000808
PCT Pub. Date: Jan. 4, 2018

(65) Prior Publication Data
US 2018/0275458 A1 Sep. 27, 2018

(30) Foreign Application Priority Data
Jun. 30, 2016 (CN) .......................... 2016 1 0513666

(51) Int. Cl.
G02F 1/1335 (2006.01)
G02F 1/1333 (2006.01)
G02F 1/1339 (2006.01)

(52) U.S. Cl.
CPC ...... *G02F 1/133516* (2013.01); *G02F 1/1333* (2013.01); *G02F 1/13394* (2013.01);
(Continued)

(58) Field of Classification Search
CPC ............ G02F 1/133516; G02F 1/1333; G02F 2001/133357; G02F 1/133514;
(Continued)

(56) References Cited

U.S. PATENT DOCUMENTS

2003/0020851 A1 1/2003 Kim et al.
2015/0131023 A1 5/2015 Kim et al.
(Continued)

FOREIGN PATENT DOCUMENTS

CN 103474438 A 12/2013
CN 103852929 A 6/2014
(Continued)

OTHER PUBLICATIONS

Apr. 17, 2017—(WO) International Search Report and Written Opinion Appn PCT/CN2017/071041 with English Tran.
(Continued)

*Primary Examiner* — Phu Vu
(74) *Attorney, Agent, or Firm* — Banner & Witcoff, Ltd.

(57) ABSTRACT

A display substrate, a manufacturing method thereof and a display device are provided. The display substrate includes: a base substrate, a display region disposed on the base substrate, and a peripheral region disposed at a periphery of the display region, and the peripheral region is provided with a filling area recessed toward the base substrate; the filling area is provided with an alignment mark and a filling
(Continued)

material; and the filling material is configured for filling the filling area. The filling material is provided in filling the filling area of the display substrate, to reduce or eliminate a segment difference at the filling area, and further to avoid the incorrect alignment of liquid crystal molecules caused by the segment difference in the rubbing process, and finally to avoid poor display due to uneven display of a display panel in the working process.

20 Claims, 5 Drawing Sheets

(52) U.S. Cl.
CPC .. *G02F 1/133512* (2013.01); *G02F 1/133514* (2013.01); *G02F 2001/133354* (2013.01); *G02F 2001/133357* (2013.01); *G02F 2001/133388* (2013.01)

(58) Field of Classification Search
CPC ........ G02F 2001/133388; G02F 2001/133354; G02F 1/13394; G02F 1/133512; G02F 1/1339; H01L 27/32
See application file for complete search history.

(56) References Cited

U.S. PATENT DOCUMENTS

| 2015/0185530 | A1 | 7/2015 | Fu et al. |
| 2017/0212370 | A1 | 7/2017 | Dong et al. |
| 2018/0107034 | A1* | 4/2018 | Yu .................... G02F 1/1339 |

FOREIGN PATENT DOCUMENTS

| CN | 105511144 A | 4/2016 |
| CN | 106154613 A | 11/2016 |

OTHER PUBLICATIONS

Jul. 3, 2017—(CN) First Office Action Appn 201610513666.6 with English Tran.

\* cited by examiner

DISPLAY SUBSTRATE, MANUFACTURING METHOD THEREOF AND DISPLAY DEVICE

The application is a U.S. National Phase Entry of International Application No. PCT/CN2017/071041 filed on Jan. 13, 2017, designating the United States of America and claiming priority to Chinese Patent Application No. 201610513666.6, filed on Jun. 30, 2016. The present application claims priority to and the benefit of the above-identified applications and the above-identified applications are incorporated by reference herein in their entirety.

TECHNICAL FIELD

Embodiments of the present disclosure relate to a display substrate, a manufacturing method thereof and a display device.

BACKGROUND

In a field of display technology, both a thin-film transistor liquid crystal display (TFT-LCD) and an organic light-emitting diode (OLED) display comprise a color filter (CF) substrate used for filtering light and an array substrate provided with a thin-film transistor (TFT) pixel array.

In order to ensure a uniform cell gap between the CF substrate and the array substrate after completion of a cell-assembly process, namely in order to ensure that a vertical distance between the CF substrate and the array substrate is equal at any positions after the cell-assembly process, alignment marks should be arranged on the CF substrate and the array substrate. Before the cell-assembly process, the alignment marks may be used for monitoring a deformation of a base substrate, for example an internal contraction and an external expansion, so as to modify the deformation of the base substrate timely. In the cell-assembly process, the alignment marks help accurate alignment between the CF substrate and the array substrate.

In order to ensure a consistent cell gap between the CF substrate and the array substrate after the cell-assembly process, spacers with a certain height are disposed between the CF substrate and the base substrate and configured to support the CF substrate. The spacers may be formed on the CF substrate, and may be formed on the array substrate. The spacers are distributed in a display region (an AA area) and a peripheral region (a dummy area) of the CF substrate or the array substrate, so as to ensure that both the AA area and the dummy area of the CF substrate can be supported by the spacers.

SUMMARY

At least one embodiment of the present disclosure provides a display substrate, and the display substrate comprises: a base substrate; and a display region disposed on the base substrate and a peripheral region disposed at a periphery of the display region, wherein the peripheral region is provided with a filling area recessed toward the base substrate; the filling area is provided with an alignment mark and a filling material; and the filling material is configured for filling the filling area.

For example, in the display substrate provided in at least one embodiment of the present disclosure, the alignment mark is disposed on one side closer to the base substrate, and the filling material is disposed above the alignment mark and is made of a transparent material.

For example, in the display substrate provided in at least one embodiment of the present disclosure, the filling material is configured for filling the filling area to allow that the filling area is flush with an area of the peripheral region except the filling area.

For example, in the display substrate provided in at least one embodiment of the present disclosure, the display substrate is a color filter substrate; both the display region and the area of the peripheral region except the filling area comprise a black matrix, a color resin layer and a dielectric protective layer, which are laminated arranged; and the filling area comprises the alignment mark and the dielectric protective layer.

For example, in the display substrate provided in at least one embodiment of the present disclosure, a plurality of spacers are further disposed in the display region and the peripheral region; and the filling material is the same as a material of the spacers.

For example, in the display substrate provided in at least one embodiment of the present disclosure, the filling material and the material of the spacers may be at least one selected from the group consisting of melamine resin, polystyrene resin and urea resin.

For example, in the display substrate provided in at least one embodiment of the present disclosure, shapes of vertical projections of the alignment marks on the base substrate comprise at least one of a cross shape, a circular shape, an annular shape and a zigzagged shape.

For example, in the display substrate provided in at least one embodiment of the present disclosure, the display substrate is an array substrate; both the display region and the area of the peripheral region except the filling area comprise a first metal layer, an insulating layer and a passivation layer which are laminated arranged; and the filling area comprises the alignment mark, the insulating layer and the passivation layer.

For example, in the display substrate provided in at least one embodiment of the present disclosure, the display region and the area of the peripheral region except the filling area are further provided with a planarization layer on the laminated layers, and the filling material is the same as the material of the planarization layer.

For example, in the display substrate provided in at least one embodiment of the present disclosure, the filling material and the planarization layer are formed in a same processing operation.

At least one embodiment of the present disclosure further provides a method for manufacturing a display substrate, and the method comprises: forming a display region and a peripheral region on a base substrate, wherein the peripheral region is disposed at a periphery of the display region; forming a filling area recessed toward the base substrate in the peripheral region; and forming an alignment mark and a filling material in the filling areas.

For example, in the manufacturing method provided in at least one embodiment of the present disclosure, forming the alignment mark and the filling material in the filling area comprises: forming the alignment mark and the filling material in the filling area in sequence, wherein the filling material is made of a transparent material.

For example, in the manufacturing method provided in at least one embodiment of the present disclosure, the filling material is configured for filling the filling area to allow that the filling area is parallel and level to an area of the peripheral region except the filling area.

At least one embodiment of the present disclosure further provides a display device, and the display device comprises any one of the above-mentioned display substrate.

BRIEF DESCRIPTION OF THE DRAWINGS

In order to clearly illustrate technical solutions of the embodiments of the present disclosure, drawings in the embodiments will be introduced simply, and it is obvious that the described drawings just relate to some of the embodiments of the present disclosure, but are not limitative of the present disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. It is obvious that the described embodiments are just a part but not all of the embodiments of the disclosure. Based on the embodiments in the disclosure, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at lease one. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "on," "under," "right," "left" and the like are only used to indicate relative position relationship, and when the position of the object which is described is changed, the relative position relationship may be changed accordingly.

In a manufacturing process of a display substrate, openings recessed into a base substrate are usually formed in a peripheral region (a dummy area) of the display substrate, and alignment marks are disposed in the openings. However, segment differences will be formed in the peripheral region. The segment differences will result in an uneven alignment film coated on a surface of a CF substrate or an array substrate. Subsequently, alignment of liquid crystal molecules is achieved by performing a rubbing process on the uneven alignment film. In this case, the liquid crystal molecules cannot be arranged along correct directions. Thus, a display panel cannot achieve a uniform display in the working process, and hence the display quality is not good.

Figure 1:
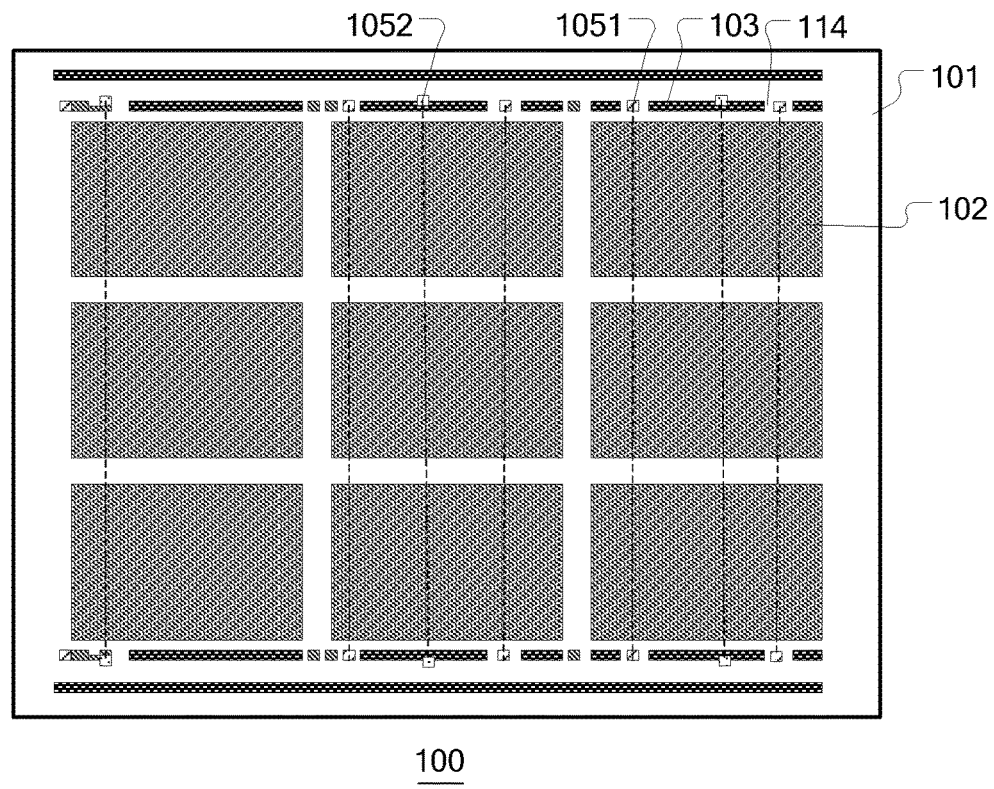
FIG. 1 is a schematic diagram of a structure of a display substrate.
Figure 2:
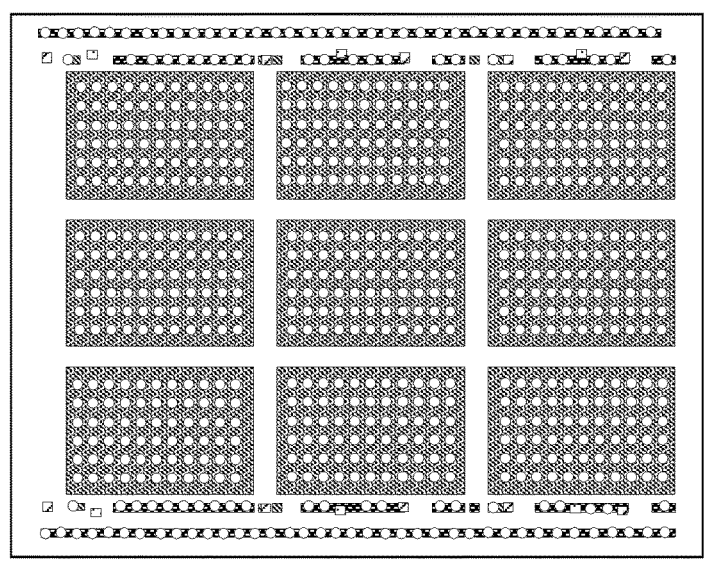
FIG. 2 is a schematic diagram of a structure of a mask used for manufacturing spacers of the display substrate as illustrated in FIG. 1.

For instance, FIG. 1 is a schematic diagram of a structure of a display substrate. For instance, as illustrated in FIG. 1, the display substrate 100 comprises a base substrate 101; the base substrate 101 is provided with display regions 102 and a peripheral region 103 disposed at the periphery of the display regions 102; the peripheral region 103 is provided with openings 114 recessed into the base substrate 101; and alignment marks (first alignment marks 1051 and second alignment marks 1052) are disposed in the openings 114. If an alignment film at the openings 114 is uneven after the alignment film is coated on a surface of the display substrate 100, grooves formed on a surface of the uneven alignment film are also uneven in a case that the alignment film is subjected to a rubbing process in FIG. 1, which causes the alignment of the liquid crystal molecules to be incorrect or uneven. FIG. 2 is a schematic diagram of a structure of a mask used for manufacturing spacers of the display substrate as illustrated in FIG. 1. It can be seen from FIG. 2, the spacers formed by the mask will not be formed at the positions of the openings 114.

Figure 3:
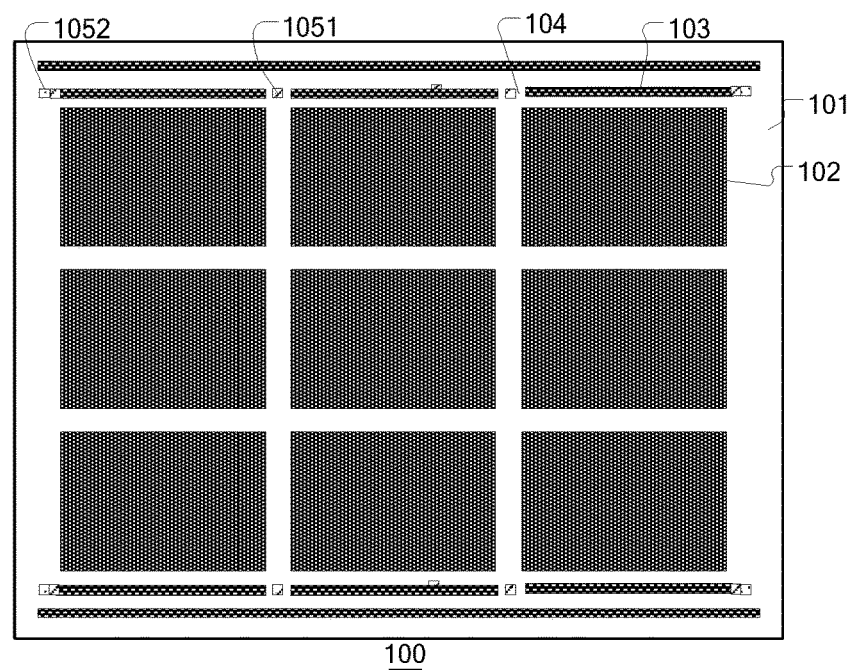
FIG. 3 is a schematic diagram of an improvement structure of the display substrate as illustrated in FIG. 1.

As for a CF substrate, in general, five sets of masks will be used in the manufacturing process of the CF substrate and are respectively used for forming a black matrix, a color resin layer (R, G and B) and a spacer, and filling areas are formed at positions corresponding to non-display regions. For instance, FIG. 3 is a schematic diagram of an improvement structure of the display substrate as illustrated in FIG. 1. For instance, alignment marks are moved outside the display regions, but even this, not all the filling areas corresponding to the display regions can be moved to the non-display regions in some cases. Moreover, even the filling areas are moved to the non-display regions, as a distance from the filing areas to the display regions is very close, the alignment of the liquid crystal molecules can also be incorrect due to a little deformation of the display substrate. Thus, the display panel cannot achieve a uniform display in the working process, and hence the display quality is not good.

At least one embodiment of the present disclosure provides a display substrate, a manufacturing method thereof and a display device. The display substrate comprises: a base substrate, a display region disposed on the base substrate, and a peripheral region disposed at a periphery of the display region, the peripheral region is provided with a filling area recessed toward the base substrate; and the filling area is provided with an alignment mark and a filling material. The filling area of the display substrate is filled with the filling material to reduce or eliminate a segment difference at the filling area, and further to avoid incorrect alignment of liquid crystal molecules caused by the segment difference in a rubbing process, and finally to avoid reducing of a display effect of a display panel.

At least one embodiment of the present disclosure provides a display substrate, a manufacturing method thereof and a display device. The display substrate is provided with filling areas. The filling areas are provided with alignment marks which are configured to monitor a deformation of the base substrate and the alignment marks are taken as alignment calibration objects in the cell-assembly process. The display substrate may be a CF substrate or an array substrate. In a case that the display substrate is a CF substrate, the filling areas may be filled in the subsequent process of forming spacers, so as to eliminate the segment differences at the filling areas, and hence to avoid the problem of uneven display of a display panel due to the segment differences at the filling areas, and meanwhile the processing operations and the production cost are reduced. In a case that the display substrate is an array substrate, the filling areas may be filled in the subsequent processes of forming an insulating layer, a passivation layer, a planarization or a spacer, so as to eliminate the segment differences at the filling areas, and hence avoid the problem of uneven display of a display panel due to the segment differences at the filling areas, and meanwhile the processing operations and the production cost are saved.

Figure 4:
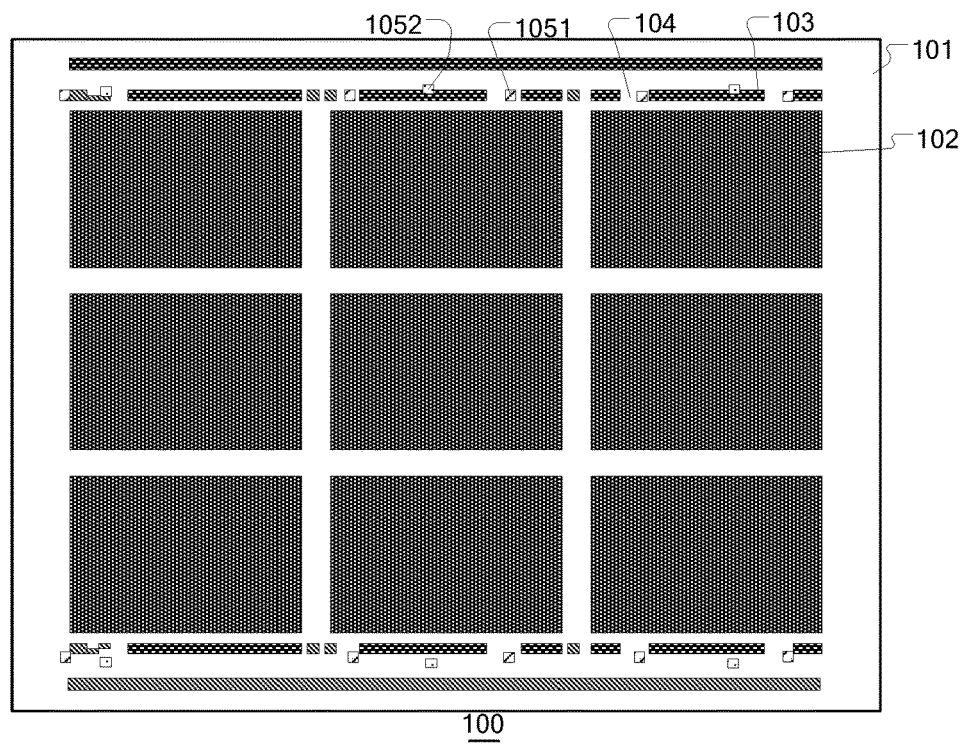
FIG. 4 is a schematic diagram of a structure of a display substrate provided in an embodiment of the present disclosure.

At least one embodiment of the present disclosure provides a display substrate. FIG. 4 is a schematic diagram of a structure of a display substrate provided in an embodiment of the present disclosure. The display substrate 100 comprises: a base substrate 101, display regions 102 disposed on the base substrate 101, and a peripheral region 103 disposed at the periphery of the display regions 102, the peripheral region 103 is provided with filling areas 104 recessed toward the base substrate 101; the filling areas 104 are provided with alignment marks and a filling material; the alignment marks are divided into first alignment marks 1051 and second alignment marks 1052; and the filling material is used for filling the filling areas.

For instance, the alignment marks are disposed on one side closer to the base substrate; and in a case that the filling material is formed above the alignment marks, the filling material is a transparent material, that is, in a case that the alignment marks are formed in the filling areas 104 at first and then the filling material is filled, the filling material filled subsequently is required to be a transparent material.

In a case that the filling material is filled in the filling areas 104 at first and then the alignment marks are formed, it is not limited to the transparency of the filling material, as long as the alignment marks can be identified.

For instance, the filling material is provided in filling the filling areas, so that the filling areas are parallel and level to an area of the peripheral region except the filling areas.

For instance, the filling material is provided in filling the filling areas 104, so that upper surfaces of the filling areas after filling can be parallel and level to or basically parallel and level to an upper surface of the peripheral region 103. Thus, the segment differences at the filling areas are eliminated, so that a coated alignment film is uniform at positions provided with the filling areas, and hence a correct alignment of liquid crystal molecules is achieved.

For instance, an area of a vertical projection of the alignment mark (the first alignment marks 1051 or the second alignment marks 1052) on the base substrate 101 is less than a bottom area of the filling area 104. For instance, as illustrated in FIG. 4, the first alignment marks 1051 are configured for detecting deformations of the base substrate, for example, a shrinkage and an expansion, and the second alignment marks 1052 are configured for detecting whether the display substrate is deviated in the process of alignment. For instance, shapes of the vertical projections of the alignment marks on the base substrate 101 comprise at least one of a cross shape, a circular shape, an annular shape and a zigzagged shape, etc. For instance, as illustrated in FIG. 4, the vertical projections of the first alignment marks 1051 on the base substrate do not cover an entire bottom surface of the filling areas 104; transparent areas are disposed between the first alignment marks 1051 and areas of the peripheral region 103 except the filling areas 104; each of the first alignment marks 1051 is not in contact with at least one of the left side or the right side of the filling area 104; it can be seen from FIG. 4, the first alignment marks 1051 are formed at disconnections of the peripheral region 103; and the vertical projections of the second alignment marks 1052 on the base substrate 101 are not cover the entire bottom surface of the entire filling area 104, but each of the second alignment marks 1052 is in contact with the left side and the right side of a filling area 104 directly, namely the second alignment marks 1052 are formed at places where are provided with the filling areas but are not disconnected of the peripheral region 103, so as to be distinguished with the first alignment marks 1051. For instance, the first alignment marks 1051 may also be in contact with the left side and the right side of the filling areas 104 directly, and the second alignment marks 1052 may also be not in contact with at least one of the left side or the right side of the filling areas 104 directly.

Figure 5:
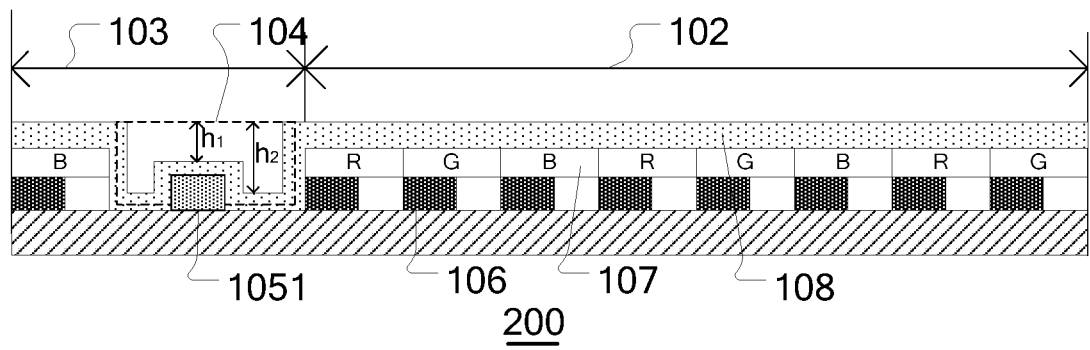
FIG. 5 is a schematic diagram of a section structure of a CF substrate provided in one embodiment of the present disclosure before filling of the filling areas of the CF substrate.

In a case that the display substrate 100 is a CF substrate 200, for instance, FIG. 5 is a schematic diagram of a section structure of a CF substrate provided in at least one embodiment of the present disclosure before filling of the filling areas of the CF substrate. The display regions 102 and areas of the peripheral region 103 except the filling areas 104 comprise a black matrix 106, a color resin layer 107 and a dielectric protective layer 108 which are laminated arranged, and the filling areas 104 comprise the alignment marks 1051 and the dielectric protective layer 108. The sequence of forming the black matrix 106 and the color resin layer 107 are not limited; the structure is not limited to the structure as illustrated in FIG. 5; and two modes may be adopted. A first mode: the black matrix 106 is formed on the base substrate at first, and then the color resin layer 107 is formed on the base substrate provided with the black matrix 106. A second mode: the color resin layer 107 is formed on the base substrate at first, and then the black matrix 106 is formed on the base substrate provided with the color resin layer 107. The color resin layer at least comprises a red resin layer, a green resin layer and a blue resin layer which are arranged in a same layer. The dielectric protective layer 108 may be made of silicon nitride, silicon oxide or silicon oxynitride which are transparent, the dielectric protective layer is formed by a coating process, and with a uniform thickness.

For instance, a thickness of the black matrix 106 is from 1.0 μm to 2.0 μm, for example, 1.15 μm; a thickness of the color resin layer 107 is from 2.5 μm to 3.5 μm, for example, 3.0 μm; and a thickness of the dielectric protective layer 108 is from 1.0 μm to 2.0 μm, for example, 1.5 μm. Thus, it can be seen that, the thickness of the color resin layer 107 is half of the thickness of the entire laminated layers; the filling areas 104 are provided with the alignment marks (the first alignment marks 1051 or the second alignment marks) and the dielectric protective layer 108; the alignment marks and the black matrix 106 are arranged in a same layer and are made of a same material. For example, the first alignment marks 1051 are neither in contact with the left side nor in contact with the right side of the filling areas 104 directly, and the dielectric protective layer 108 is filled in the entire filling area 104. For instance, a distance from the dielectric protective layer 108 correspondingly disposed on the first alignment marks 1051 to a surface of the peripheral region 103 is h1, and the h1 is the thickness of the color resin layer 107. The dielectric protective layer 108 is also disposed at areas of the filling areas 104 except the first alignment marks 1051. In the filling areas 104, a distance from the dielectric protective layer 108 in areas not corresponding to the first alignment marks 1051 to the surface of the peripheral region 103 is h2; and the h2 is a sum of the thickness of the color resin layer 107 and the thickness of the first alignment marks 1051. Therefore, segment differences at the filling areas are very obvious; and in order to avoid adverse effects on the subsequent processes by the segment differences, it is necessary to fill the filling areas to eliminate the segment differences.

Figure 6:
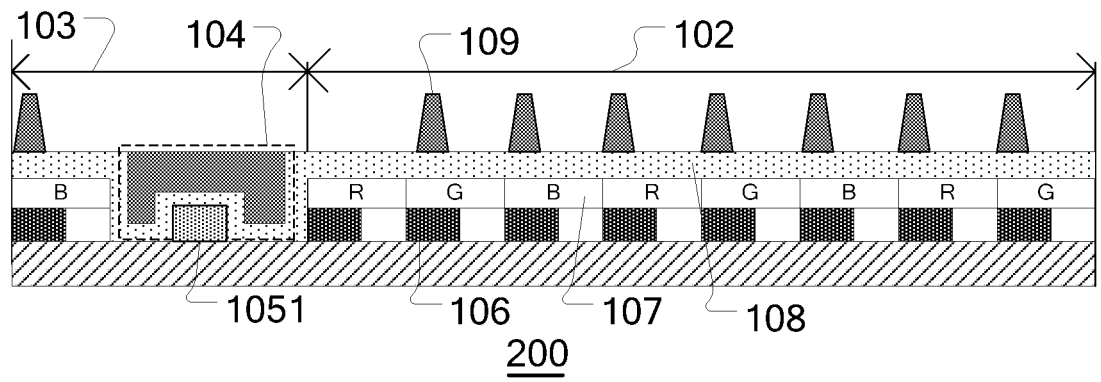
FIG. 6 is a schematic diagram of a section structure of a CF substrate provided in one embodiment of the present disclosure after filling of the filling areas of the CF substrate.

For instance, FIG. 6 is a schematic diagram of a section structure of a CF substrate provided in one embodiment of the present disclosure after filling of the filling areas of the CF substrate. A plurality of spacers 109 are further disposed in the display regions 102 and the peripheral region 103 of the CF substrate 200. For instance, a thickness (a height) of each spacer 109 is from 2.8 μm to 3.8 μm, and the plurality of spacers 109 are uniformly distributed on the display substrate. The filling material and the spacers 109 are formed in a same processing operation, so that the filling areas 104 are filled simultaneously when the spacers 109 are formed, and hence the processing operation is saved.

For instance, the filling material may also be formed after the spacers 109 are formed.

For instance, the filling material is a transparent material; in a case that the filling material and the spacers 109 are formed in a same processing operation, the filling material is the same with the material of the spacers; and in a case that the filling areas 104 are filled after the spacers 109 are formed, the filling material and the material of the spacers may be different.

Figure 7:
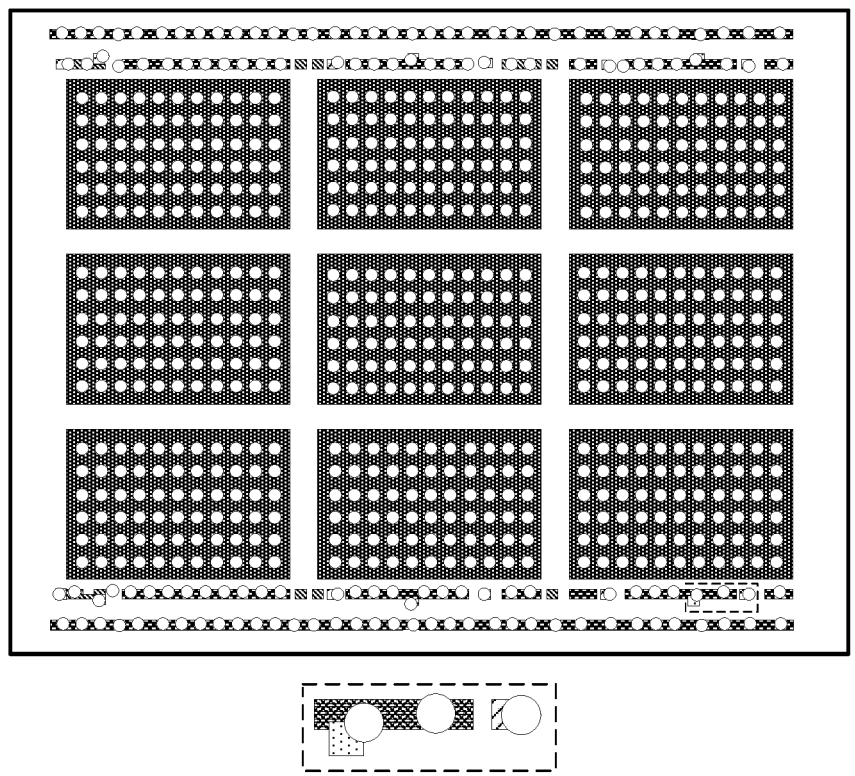
FIG. 7 is a schematic diagram of a structure and a partial enlarged view of a mask used for manufacturing spacers of the display substrate in FIG. 4.

For instance, the filling material and the material of the spacers may be a transparent resin material, for example, melamine resin, polystyrene resin, urea resin, or a material of a negative photoresist or a positive photoresist. For instance, after the transparent negative photoresist is coated on the CF substrate, exposuring is performed, the exposed negative photoresist is retained, and the non-exposed negative photoresist is removed. For instance, FIG. 7 is a schematic diagram of a structure and a partial enlarged view of a mask used for manufacturing spacers of the display substrate in FIG. 4. In a case that the mask as illustrated in FIG. 7 is used for performing a masking process, the white region is an exposure region, the negative photoresist in the exposure region is retained to form the spacers; and meanwhile, the filling areas are filled.

For instance, as illustrated in FIG. 6, a surface of the filling materials away from the base substrate 101 is parallel and level to a surface of the dielectric protective layer 108 in the display regions 102 away from the base substrate, or the filling material is filled in the filling areas 104 and protrudingly disposed on the filling areas 104, so that the surfaces of the filling areas away from the base substrate are parallel and level to the surfaces of the spacers in the display regions 102 away from the base substrate (not shown in the figure).

The shape of the spacers is not limited. For instance, the shapes of the spacers may be in a columnar shape or in other shapes.

It should be noted that, the peripheral region of the display substrate provided by the embodiment of the present disclosure at least comprises one peripheral area close to the display regions on the display substrate; the peripheral area is retained after performing the cell-assembly process of the display substrate, and another peripheral area away from the display regions is cut when performing the cell-assembly process of the display substrate, so that partial or all the peripheral circuits on a substrate arranged opposite to the display substrate is exposed; or the peripheral region is the area on the display substrate except the display regions. The peripheral regions in the following embodiments are also explained like this.

The embodiment of the present disclosure provides a display substrate. The display substrate is an array substrate 300. For instance, FIG. 8 is a schematic diagram of a section structure of an array substrate provided in one embodiment of the present disclosure before filling of the filling areas of the array substrate.

For instance, both the display regions 102 and the areas of the peripheral region 103 except the filling areas comprise a first metal layer 110, an insulating layer 111 and a passivation layer 112 which are laminated arranged; and the filling areas 104 comprise alignment marks 1051, the insulating layer 111 and the passivation layer 112. The filling areas 104 comprise two parts. The first part is a laminated structure provided with the first alignment marks 1051, the insulating layer 111 and the passivation layer 112, and the second part is a transparent area only provided with the insulating layer 111 and the passivation layer 112.

For instance, the shapes of vertical projections of the first alignment marks 1051 on the base substrate 101 comprise a cross shape, a circular shape, an annular shape and a zigzagged shape.

Figure 8:
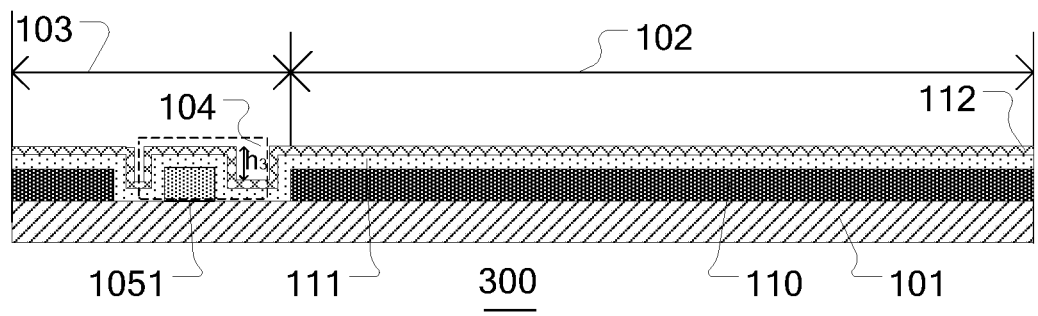
FIG. 8 is a schematic diagram of a section structure of an array substrate provided in one embodiment of the present disclosure before filling of the filling areas of the array substrate.

For instance, as illustrated in FIG. 8, a vertical projection of the first alignment mark 1051 on the base substrate does not cover a bottom surface of the entire filling areas 104; the filling areas 104 are also provided with transparent areas; and the first alignment marks 1051 may also be not in contact with at least one of the left side or the right side of the filling areas 104 directly.

For instance, as illustrated in FIG. 8, as both the insulating layer 111 and the passivation layer 112 are made of a transparent material and will be deposited on the entire base substrate, so that the segment differences are mainly formed in the filling areas 104. As illustrated in FIG. 8, a height of each segment differences is h3, and the h3 is the thickness (the height) of the first metal layer 110.

For instance, the insulating layer 111 and the passivation layer 112 may be made of silicon nitride, silicon oxide or silicon oxynitride which are transparent materials.

Figure 9:
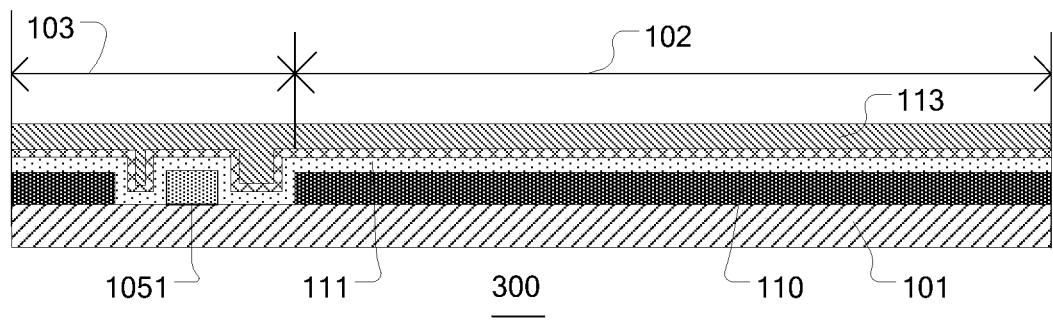
FIG. 9 is a schematic diagram of a section structure of an array substrate provided in one embodiment of the present disclosure after filling of the filling areas of the array substrate.

For instance, FIG. 9 is a schematic diagram of a section structure of an array substrate provided in one embodiment of the present disclosure after filling of the filling areas of the array substrate. For instance, a planarization layer 113 is also disposed in the display regions 102 and the peripheral region 103, and the filling material and the planarization layer 113 are formed in a same processing operation, so that the filling areas 104 are filled simultaneously when the planarization layer 113 is formed, and hence the processing operation is saved. For instance, the filling material may also be formed after the planarization layer 113 is formed.

For instance, the filling material is a transparent material; in a case that the filling material and the planarization layer 113 are formed in a same processing operation, the filling material is the same as the material of the planarization layer 113; and in a case that the filling areas are filled after the planarization layer 113 is formed, the filling material and the material of the planarization layer 113 may be different.

It should be noted that, the filling areas may also be filled in the process of forming the insulating layer 111 or the passivation layer 112. That is to say, the filling material and the insulating layer 111 or the passivation layer 112 are formed in the same processing operation, so that the filling areas is filled simultaneously when the insulating layer 111 or the passivation layer 112 is formed, and hence the processing operation is saved.

For an array substrate, the spacers may be formed after the planarization layer is formed; the filling areas are not filled before the planarization layer is formed; and the filling material and the spacers are formed in a same processing operation, so that filling of the filling areas when the spacers are formed, the processing operations are saved. The relevant contents may refer to the corresponding descriptions described above.

Figure 10:
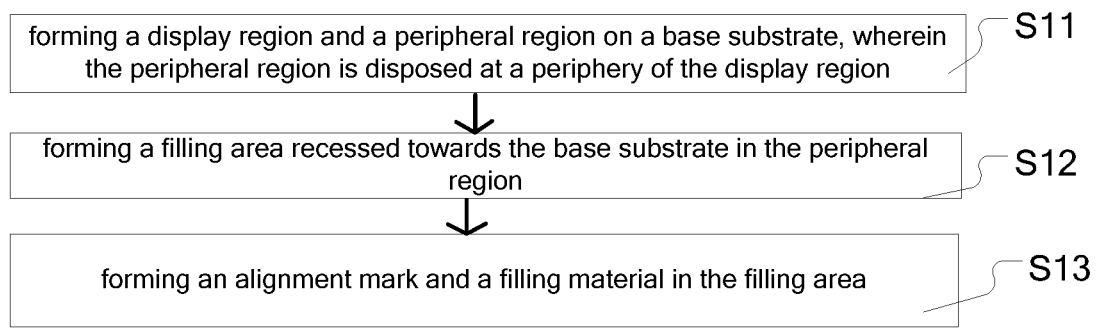
FIG. 10 is an overall flow diagram of a method for manufacturing a display substrate provided in one embodiment of the present disclosure.

The embodiment of the present disclosure further provides a method for manufacturing a display substrate. FIG. 10 is an overall flow diagram of a method for manufacturing a display substrate provided in one embodiment of the present disclosure. As illustrated in FIG. 10, the method comprises:

S11: forming a display region and a peripheral region on a base substrate, wherein the peripheral region is disposed at a periphery of the display region;

S12: forming a filling area recessed towards the base substrate in the peripheral region; and S13: forming an alignment mark and a filling material in the filling area.

For instance, the operations of forming the alignment mark and the filling material in the filling area comprise: forming the alignment mark and the filling material in the filling areas in sequence, the filling material is made of a transparent material, that is, in a case that the alignment mark is formed in the filling area at first and then the filling material is filled, the filling material which is filled subsequently is required to be a transparent material.

In a case that, the filling material is filled in the filling areas at first and then the alignment marks are formed, whether the filling material is transparent or not is not limited, as long as the alignment marks can be identified.

For instance, the filling material is used for filling the filling areas, so that the filling areas can be parallel and level to an area of the peripheral region except the filling areas.

For instance, the filling material is used for filling the filling areas, so that the filling areas can be parallel and level to a surface of the peripheral region away from the base substrate, and hence the segment differences between the filling areas and a main part of the peripheral region are eliminated.

For instance, the area of a vertical projection of each alignment marks on the base substrate is less than an area of the surface of the filling area close to the base substrate. The alignment marks have colors. If the area of the vertical projection of each alignment marks on the base substrate is the bottom area of the filling area, in the case of aligning of the display substrate, the filling area is difficult to be distinguished from the main part of the peripheral region, and thus the alignment marks can not achieve the effect of acting as alignment signs.

For instance, in a case that the display substrate is a color filter substrate, the method may comprise: forming a laminated layer of a black matrix, a color resin layer and a dielectric protective layer in the display regions and areas of the peripheral region except the filling areas, and forming alignment marks and the dielectric protective layer in the filling areas. The method may further comprise: forming a plurality of spacers in the display regions and the peripheral region, and the filling material and the spacers are formed in a same processing operation or the filling material is filled after the spacers are formed.

For instance, the filling material is a transparent material, in a case that the filling material and the spacers are formed in a same processing operation, the filling material is the same as the material of the spacers; and in a case that the filling area is filled after the spacers are formed, the filling material and the material of the spacers may be different.

For instance, both the filling material and the material of the spacers may be negative photoresist. After the transparent negative photoresist is coated on the color film substrate, the negative photoresist is exposed, the exposed negative photoresist is retained, and the non-exposed negative photoresist is removed.

For instance, the black matrix and the alignment marks may be formed in a same processing operation. The forming process of the black matrix and the alignment marks comprises: forming a metallic film with a equal thickness (height) for covering the entire base substrate in the display regions and the peripheral region; performing processes such as exposuring, developing and etching on the metallic film in the display regions and the peripheral region, forming a black matrix in the display regions and the main part of the peripheral region, and forming the alignment marks in the filling areas.

For instance, in a case that the display substrate is an array substrate, the method may comprise: forming a first metal layer, an insulating layer and a passivation layer in the display regions and the peripheral region, and forming the filling areas in a laminated layer of the first metal layer, the insulating layer and the passivation layer. The method further comprises: forming a planarization layer in the display regions and the peripheral region, in which the filling material and the planarization layer are formed in a same processing operation or filling of the filling areas after the planarization layer is formed.

For instance, the filling material is a transparent material, in a case that the filling material and the planarization layer are formed in a same processing operation, the filling material is the same as the material of the planarization layer; and in a case that the filling areas are filled after the planarization layer is formed, the filling material and the material of the planarization layer may be different.

For instance, the filling areas may also be filled in the process of forming the insulating layer or the passivation layer. That is to say, the filling material and the insulating layer or the passivation layer are formed in a same processing operation. So that the filling areas are filled when the insulating layer or the passivation layer is formed, the processing operation is saved.

For an array substrate, the spacers may be formed after the planarization layer is formed; the filling areas are not filled before the planarization layer is formed; and the filling material and the spacers are formed in a same processing operation, so that filling of the filling areas when the spacers are formed, and the processing operation is saved.

At least one embodiment of the present disclosure provides a display device, and the display device comprises any one of the display substrate described above. For instance, the display device may be: a liquid crystal display panel, an electronic paper, an organic light-emitting diode panel (short for OLED), a television, a digital camera, a mobile phone, a tablet computer, a notebook computer, a navigation system and any other product or component having a display function.

At least one embodiment of the present disclosure provides a display substrate, a manufacturing method thereof and a display device. The display substrate, the manufacturing method thereof and the display device have at least one of the following advantages:

(1) in the display substrate provided in at least one embodiment of the present disclosure, the filling areas are filled with the filling material, so that the segment differences at the filling areas are eliminated, and hence the coated alignment film is even, further the incorrect alignment of liquid crystal molecules is avoided, and finally the uneven display and the poor display of the display panel are avoided.

(2) in the display substrate provided in at least one embodiment of the present disclosure, in a case that the display substrate is a color filter substrate, the filling areas are filled simultaneously when the spacers are formed, and the processing operations are saved.

(3) in the display substrate provided in at least one embodiment of the present disclosure, in a case that the display substrate is an array substrate, the filling areas may also be filled in the process of forming the insulating layer or the passivation layer, the filling areas can be filled when at least one of the insulating layer, the passivation layer, the planarization layer and the spacers are formed, the processing operation and the cost are saved.

The following points need to be explained:

(1) The drawings of the embodiments of the present disclosure are only related to the structures related to the embodiments of the present disclosure, and other structures can refer to general designs.

(2) For clarity, in the drawings for describing the embodiments of the present disclosure, a thickness of a layer or a thickness of a region is amplified or reduced, that is, these drawings are not drawn according to an actual scale. It should be understood that: in a case that an element such as a layer, a film, a region or a substrate is referred to as being disposed "on" or "beneath" another element, the element may be "directly" disposed "on" or "beneath" another element, or an intermediate element may be provided.

(3) In the absence of conflict, the embodiments of the present disclosure and the features in the embodiments can be combined with each other to obtain new embodiments.

What are described above is related to the illustrative embodiments of the disclosure only and not limitative to the scope of the disclosure. Therefore, the scopes of the disclosure are defined by the accompanying claims.

The application claims priority of Chinese Patent Application No. 201610513666.6, filed on Jun. 30, 2016, the disclosure of which is incorporated herein by reference in its entirety as part of the present application.

What is claimed is:

1. A display substrate, comprising:
a base substrate; and
a display region disposed on the base substrate and a peripheral region disposed at a periphery of the display region,
wherein the peripheral region is provided with a filling area recessed toward the base substrate, the filling area is provided with an alignment mark and a filling material, the filling material is configured for filling the filling area,
the alignment mark comprises first alignment marks and second alignment marks, and the first alignment marks and the second alignment marks are spaced apart from each other,
each of the first alignment marks is not in contact with at least one of a left side or a right side of the filling area,
each of the second alignment marks is directly in contact with both the left side and the right side of the filling area, and
both the alignment mark and the filling material are disposed on the base substrate.

2. The display substrate according to claim 1, wherein the alignment mark is disposed on one side closer to the base substrate compared with the filling material, and the filling material is disposed above the alignment mark and is made of a transparent material.

3. The display substrate according to claim 1, wherein the filling material is configured for filling the filling area so that the filling area is flush with an area of the peripheral region outside of the filling area.

4. The display substrate according to claim 3, wherein the display substrate is a color filter substrate, both the display region and the area of the peripheral region outside of the filling area comprise a black matrix, a color resin layer, and a dielectric protective layer, which are laminated arranged, and the filling area comprises the alignment mark and the dielectric protective layer.

5. The display substrate according to claim 1, wherein a plurality of spacers are further disposed in the display region and the peripheral region, and the filling material is the same as a material of the spacers.

6. The display substrate according to claim 5, wherein the filling material and the material of the spacers may be at least one selected from the group consisting of melamine resin, polystyrene resin, and urea resin.

7. The display substrate according to claim 1, wherein shapes of vertical projections of the alignment marks on the base substrate comprise at least one of a cross shape, a circular shape, an annular shape, and a zigzagged shape.

8. The display substrate according to claim 3, wherein the display substrate is an array substrate, both the display region and the area of the peripheral region outside of the filling area comprise a first metal layer, an insulating layer and a passivation layer which are laminated arranged, and the filling area comprises the alignment mark, the insulating layer and the passivation layer.

9. The display substrate according to claim 8, wherein the display region and the area of the peripheral region outside of the filling area are further provided with a planarization layer on the first metal layer, the insulating layer, and the passivation layer, and the filling material is the same as a material of the planarization layer.

10. The display substrate according to claim 9, wherein the filling material and the planarization layer are formed in a same processing operation.

11. A method for manufacturing a display substrate, comprising:
- forming a display region and a peripheral region on a base substrate, wherein the peripheral region is disposed at a periphery of the display region;
- forming a filling area recessed toward the base substrate in the peripheral region; and
- forming an alignment mark and a filling material in the filling area,
- wherein the alignment mark comprises first alignment marks and second alignment marks, and the first alignment marks and the second alignment marks are spaced apart from each other,
- each of the first alignment marks is not in contact with at least one of a left side or a right side of the filling area,
- each of the second alignment marks is directly in contact with both the left side and the right side of the filling area, and
- both the alignment mark and the filling material are disposed on the base substrate.

12. The method according to claim 11, wherein the forming the alignment mark and the filling material in the filling area comprises:
- forming the alignment mark and the filling material in the filling area in sequence, wherein the filling material is made of a transparent material.

13. The method according to claim 11, wherein the filling material is configured for filling the filling area to allow that the filling area to be parallel to and level with an area of the peripheral region outside of the filling area.

14. A display device, comprising the display substrate according to claim 1.

15. The display substrate according to claim 2, wherein the filling material is configured for filling the filling area so that the filling area is flush with an area of the peripheral region outside of the filling area.

16. The display substrate according to claim 2, wherein a plurality of spacers are further disposed in the display region and the peripheral region, and the filling material is the same as a material of the spacers.

17. The display substrate according to claim 3, wherein a plurality of spacers are further disposed in the display region and the peripheral region, and the filling material is the same as a material of the spacers.

18. The display substrate according to claim 4, wherein a plurality of spacers are further disposed in the display region and the peripheral region, and the filling material is the same as a material of the spacers.

19. The display substrate according to claim 2, wherein shapes of vertical projections of the alignment marks on the base substrate comprise at least one of a cross shape, a circular shape, an annular shape, and a zigzagged shape.

20. The method according to claim 12, wherein the filling material is configured for filling the filling area so that the filling area is parallel to and level with an area of the peripheral region outside of the filling area.

* * * * *